(12) United States Patent
Yoshizawa et al.

(10) Patent No.: US 11,272,245 B2
(45) Date of Patent: Mar. 8, 2022

(54) VIDEO OUTPUT SYSTEM, VIDEO OUTPUT DEVICE, AND CABLE

(71) Applicant: MAXELL, LTD., Kyoto (JP)

(72) Inventors: Kazuhiko Yoshizawa, Kyoto (JP); Nobuaki Kabuto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 135 days.

(21) Appl. No.: 16/095,947

(22) PCT Filed: Apr. 26, 2016

(86) PCT No.: PCT/JP2016/063069
§ 371 (c)(1),
(2) Date: Oct. 24, 2018

(87) PCT Pub. No.: WO2017/187515
PCT Pub. Date: Nov. 2, 2017

(65) Prior Publication Data
US 2019/0158913 A1    May 23, 2019

(51) Int. Cl.
*H04N 21/4363* (2011.01)
*G09G 5/00* (2006.01)
(Continued)

(52) U.S. Cl.
CPC ..... *H04N 21/43635* (2013.01); *G06F 3/1423* (2013.01); *G09G 5/006* (2013.01);
(Continued)

(58) Field of Classification Search
CPC ........ H04N 21/43635; H04N 21/43622; G06F 3/1423; G09G 5/006; G09G 5/008; G09G 2300/0426; G09G 2370/12; G09G 2370/14
See application file for complete search history.

(56) References Cited

U.S. PATENT DOCUMENTS 6,285,344 B1 * 9/2001 Everard ............... G06F 3/1475
345/213
8,403,571 B2 * 3/2013 Walker .................. G06F 13/385
385/88
(Continued)

FOREIGN PATENT DOCUMENTS

| JP | 2012-507947 A | 3/2012 |
| JP | 2013-102453 A | 5/2013 |
| WO | 2011/158310 A1 | 12/2011 |

OTHER PUBLICATIONS

International Search Report of PCT/JP2016/063069 dated Aug. 9, 2016.

*Primary Examiner* — Henry Tsai
*Assistant Examiner* — Aurangzeb Hassan
(74) *Attorney, Agent, or Firm* — Mattingly & Malur, PC

(57) ABSTRACT

A video output device has a first cable which connects an input terminal of a display and the input/output terminal of the video output device. A second cable connects the input/output terminal of an information device and the input/output terminal of the video output device. The input terminal of the display has an input terminal section which is connected to an embedded termination power source through a termination resistor. Each of the input/output terminals of the information device and video output device has an output terminal section connected through a capacitor. The input/output terminal of the video output device has functions of detecting whether the input/output terminal of the video output device is connected to the input terminal of the display apparatus through the first cable or the input/output terminal of the video output device is connected to the input/output terminal of the information device through the second cable.

2 Claims, 8 Drawing Sheets

| Pin | Signal | Signal | Pin |
|-----|--------|--------|-----|
| 1 | TMDS D2+ | TMDS D2shield | 2 |
| 3 | TMDS D2- | TMDS D1+ | 4 |
| 5 | TMDS D1shield | TMDS D1- | 6 |
| 7 | TMDS D0+ | TMDS D0shield | 8 |
| 9 | TMDS D0- | TMDS CLK+ | 10 |
| 11 | TMDS CLKshield | TMDS CLK- | 12 |
| 13 | CEC | Utility/HEC+ | 14 |
| 15 | DDC/SCL | DDC/SDA | 16 |
| 17 | DDC/CEC Gnd | +5V Power | 18 |
| 19 | HPD/HEC- | | |

(51) Int. Cl.
*G06F 3/14* (2006.01)
*H04N 21/436* (2011.01)

(52) U.S. Cl.
CPC ..... *G09G 5/008* (2013.01); *G09G 2300/0426* (2013.01); *G09G 2370/12* (2013.01); *G09G 2370/14* (2013.01); *H04N 21/43622* (2013.01)

(56) References Cited

U.S. PATENT DOCUMENTS

| | | | | |
|---|---|---|---|---|
| 8,824,613 | B2* | 9/2014 | Shimizu | H04L 25/0272 |
| | | | | 370/516 |
| 8,860,884 | B2* | 10/2014 | Matsubayashi | G09G 5/006 |
| | | | | 348/467 |
| 9,337,902 | B2* | 5/2016 | Raab | H04B 5/0037 |
| 9,407,469 | B2* | 8/2016 | Agrawal | H04L 5/20 |
| 9,516,362 | B2* | 12/2016 | Velasco | H04N 21/25 |
| 9,575,917 | B1* | 2/2017 | Zhu | G06F 13/385 |
| 9,892,483 | B2* | 2/2018 | Lee | G09G 3/20 |
| 10,218,488 | B2* | 2/2019 | Toba | H04N 21/436 |
| 10,410,586 | B2* | 9/2019 | Ahn | G09G 3/3258 |
| 2006/0291569 | A1 | 12/2006 | Kabuto et al. | |
| 2010/0109795 | A1 | 5/2010 | Jones et al. | |
| 2010/0245366 | A1* | 9/2010 | Nath | G09G 5/006 |
| | | | | 345/502 |
| 2011/0068632 | A1* | 3/2011 | Du | H02M 1/10 |
| | | | | 307/75 |
| 2011/0102411 | A1* | 5/2011 | Chang | G09G 3/3406 |
| | | | | 345/212 |
| 2014/0325099 | A1* | 10/2014 | Nakatsuru | H04N 21/43635 |
| | | | | 710/64 |
| 2015/0046945 | A1 | 2/2015 | Zhang | |
| 2016/0006584 | A1* | 1/2016 | Agrawal | H03K 17/687 |
| | | | | 375/299 |
| 2017/0060213 | A1* | 3/2017 | Wu | G06F 1/26 |

* cited by examiner

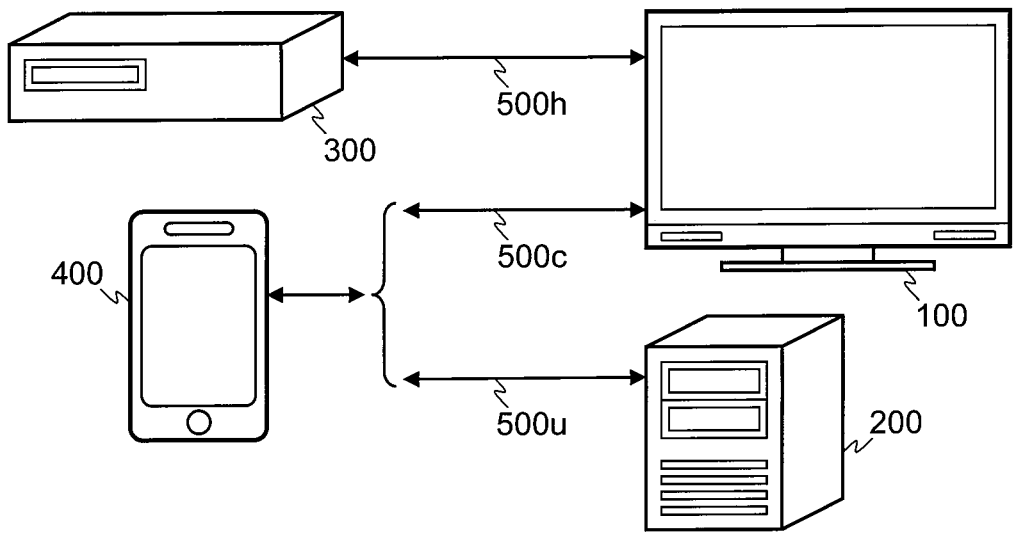

(A) Receptacle Configuration

| Pin | Signal | Signal | Pin |
|---|---|---|---|
| B12 | GND | GND | A1 |
| B11 | RX1+ | TX1+ | A2 |
| B10 | RX1- | TX1- | A3 |
| B9 | $V_{BUS}$ | $V_{BUS}$ | A4 |
| B8 | SBU2 | CC1 | A5 |
| B7 | D- | D+ | A6 |
| B6 | D+ | D- | A7 |
| B5 | CC2 | SBU1 | A8 |
| B4 | $V_{BUS}$ | $V_{BUS}$ | A9 |
| B3 | TX2- | RX2- | A10 |
| B2 | TX2+ | RX2+ | A11 |
| B1 | GND | GND | A12 |

(B) Plug Configuration

| Pin | Signal | Signal | Pin |
|---|---|---|---|
| A1 | GND | GND | B12 |
| A2 | TX1+ | RX1+ | B11 |
| A3 | TX1- | RX1- | B10 |
| A4 | $V_{BUS}$ | $V_{BUS}$ | B9 |
| A5 | CC | SBU2 | B8 |
| A6 | D+ |  | B7 |
| A7 | D- |  | B6 |
| A8 | SBU1 | $V_{CONN}$ | B5 |
| A9 | $V_{BUS}$ | $V_{BUS}$ | B4 |
| A10 | RX2- | TX2- | B3 |
| A11 | RX2+ | TX2+ | B2 |
| A12 | GND | GND | B1 |

FIG. 7
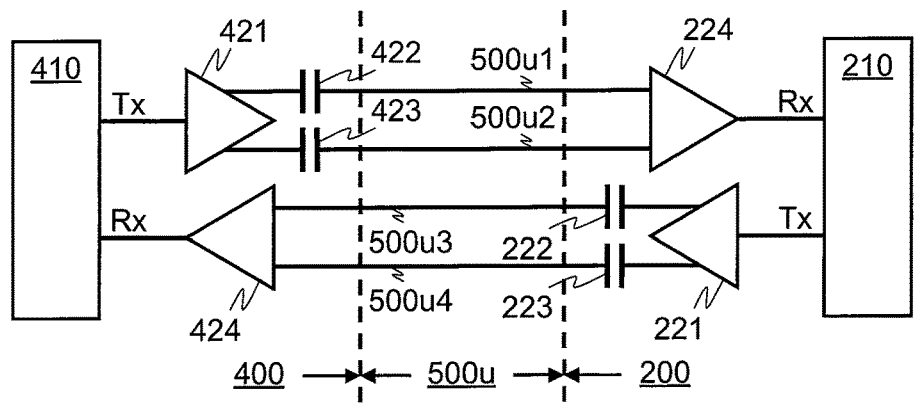
FIG. 8
| HDMI Side | | USB Type-C Side | | | | HDMI Side | |
|---|---|---|---|---|---|---|---|
| Signal | Pin | Pin | Signal | Signal | Pin | Pin | Signal |
| TMDS D1shield | 5 | A1 | GND | GND | B12 | 2 | TMDS D2shield |
| TMDS D1+ | 4 | A2 | TX1+ | RX1+ | B11 | 1 | TMDS D2+ |
| TMDS D1− | 6 | A3 | TX1− | RX1− | B10 | 3 | TMDS D2− |
| | | A4 | V$_{BUS}$ | V$_{BUS}$ | B9 | | |
| | | ⋮ | | | | | |
| | | A9 | V$_{BUS}$ | V$_{BUS}$ | B4 | | |
| TMDS D0− | 9 | A10 | RX2− | TX2− | B3 | 12 | TMDS CLK− |
| TMDS D0+ | 7 | A11 | RX2+ | TX2+ | B2 | 10 | TMDS CLK+ |
| TMDS D0shield | 8 | A12 | GND | GND | B1 | 11 | TMDS CLKshield |
FIG. 9
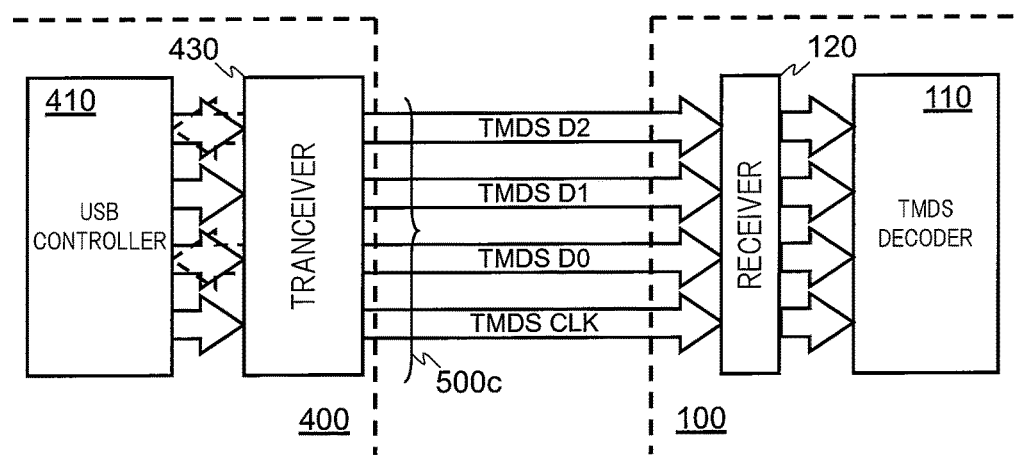

FIG. 10
(A)
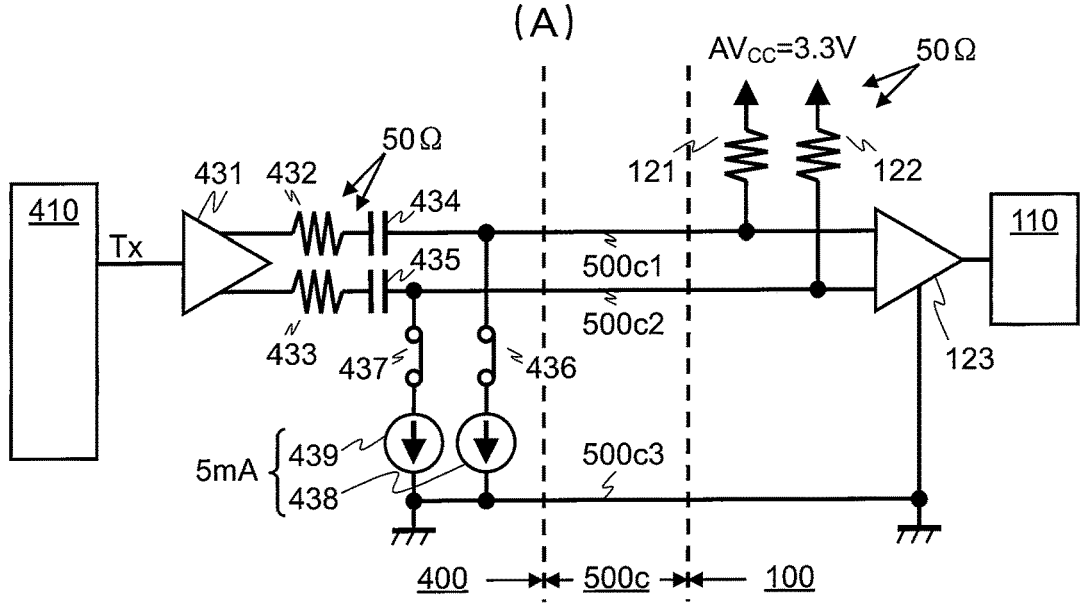
(B)
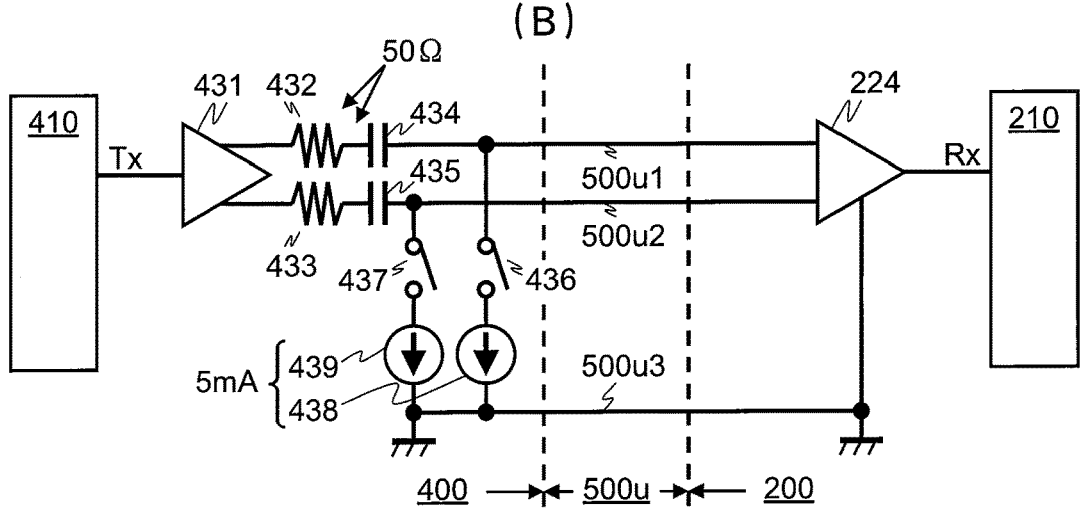
FIG. 11
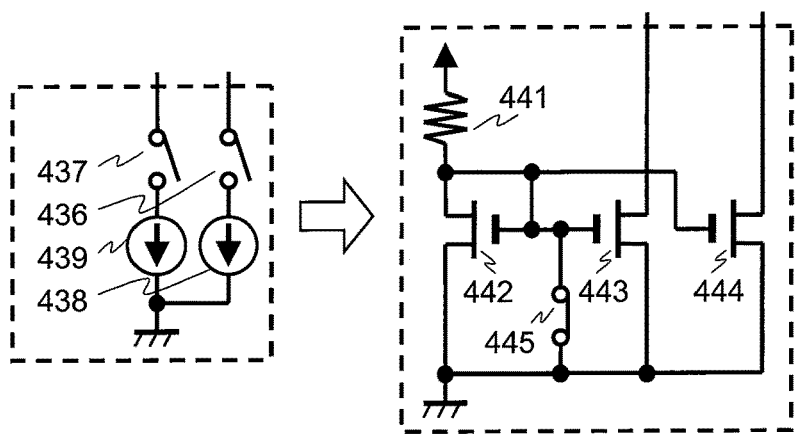

FIG. 12
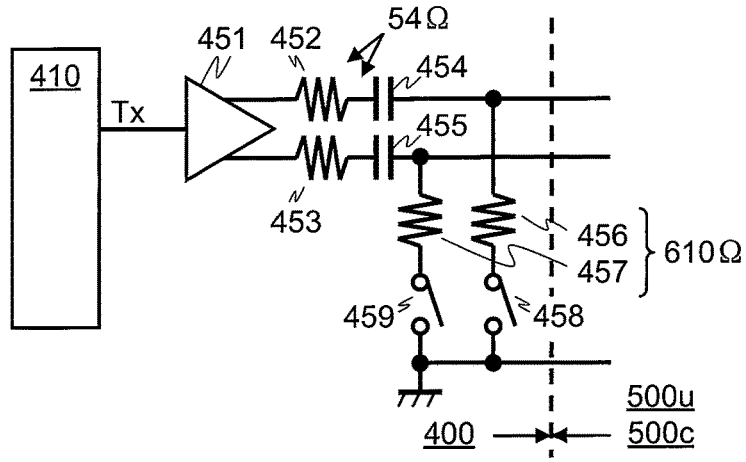
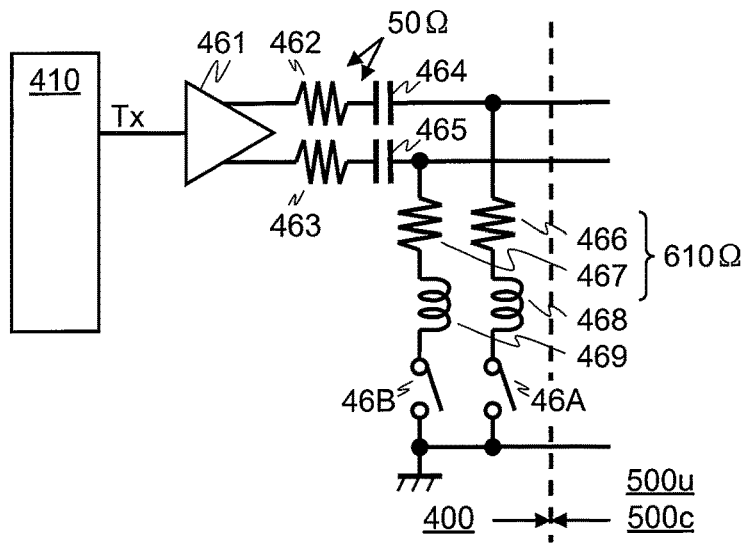
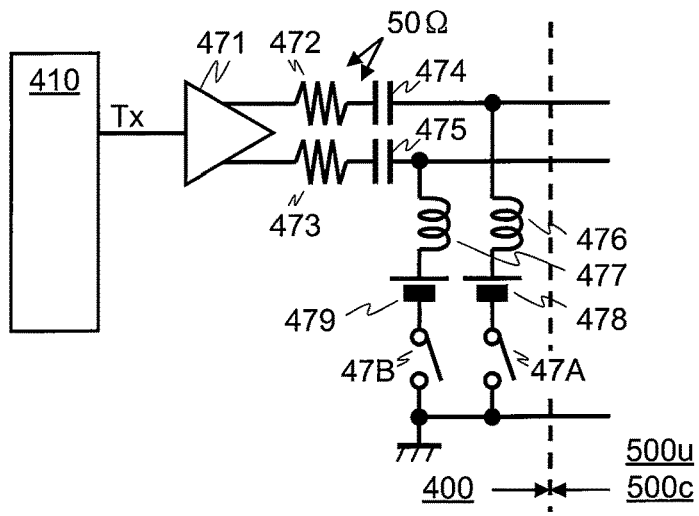

| AVcc(V) | R121(Ω) | R511(Ω) | R512(Ω) | Vicm1 / AVcc-Vicm1(V) HDMI mode | Vicm1 (V) USB mode |
|---|---|---|---|---|---|
| 3.300 | 50 | 32 | 578 | 3.050 / 0.250 | 1.29 |
| 3.300 | 50 | 32 | 389 | 2.950 / 0.350 | 1.29 |
| 3.300 | 50 | 32 | 3685 | 3.256 / 0.044 | 1.29 |
| 3.465 | 55 | 32 | 389 | 3.065 / 0.400 | 1.27 |
| 3.135 | 45 | 32 | 3685 | 3.0975 / 0.0375 | 1.30 |

VIDEO OUTPUT SYSTEM, VIDEO OUTPUT DEVICE, AND CABLE

TECHNICAL FIELD

The present invention relates to a video output system, a video output device, and a cable.

BACKGROUND ART

As an interface which can transmit a high-quality digital video signal/audio signal output from a video/audio output device such as an STB (Set Top Box) and a BD (Blu-Ray (registered trademark) Disc) player/recorder to a television receiver and a display monitor, there is an HDMI (High Definition Multimedia Interface: registered trademark). The HDMI can transmit a video signal, an audio signal, and a control signal by a single cable, is easily handled, and is adopted in many home AV devices.

The specification of the HDMI has been revised repeatedly from the first version of December 2002 to be expanded in functions and improved in data transmission speed, and has been enhanced in convenience. In addition, Patent Document 1 listed below discloses a technique of further increasing the convenience by employing a bidirectional transmission in a data line and a clock line of the HDMI.

On the other hand, as an interface for connecting peripheral devices to an information device such as a computer, there is USB (Universal Serial Bus). The specification of the USB has been also revised repeatedly from the first version of January 1996 to be improved in maximum data transmission speed and expanded in power feeding capability. In addition, with the downsizing of terminals, USB terminals have been mounted to information appliances such as a smart phone and a tablet. In the information appliances such as a smart phone and a tablet, transmission and reception of various types of data and charging are enabled through the USB terminals.

RELATED ART DOCUMENTS

Patent Documents

Patent Document 1: Japanese Patent Application Laid-Open Publication No. 2013-102453

SUMMARY OF THE INVENTION

Problems to be Solved by the Invention

In information appliances such as a smart phone and a tablet, a digital camera function and a moving image playback function are also generally mounted, and there are also many requests for viewing image data captured by the digital camera function and moving image data played by the moving image playback function, on a large screen of a television receiver. However, although the HDMI terminal is mounted in a typical home AV device, the USB terminal is not mounted in many cases. In addition, it cannot be said that mounting the HDMI terminal to information appliances such as the smart phone and the tablet in which the USB terminal is already mounted is preferable from the viewpoint of both an installation area (volume) in a casing and cost. Namely, it is preferable to mount a single terminal which is adaptable to a plurality of interface specifications in the information appliances described above.

An object of the present invention is to provide an information output device having an interface through which data can be output more preferably.

Means for Solving the Problems

As means for solving the issue described above, the technique disclosed in claims is used.

As an example, a video output system is used, and the video output system comprises: a display apparatus including an input terminal; an information device including an input/output terminal; a video output device including an input/output terminal; a first cable which connects the input terminal of the display apparatus and the input/output terminal of the video output device; and a second cable which connects the input/output terminal of the information device and the input/output terminal of the video output device, wherein the input terminal of the display apparatus has an input terminal section which is connected to an embedded termination power source through a termination resistor, wherein each of the input/output terminal of the information device and the input/output terminal of the video output device has an output terminal section connected through a capacitor, and wherein the input/output terminal of the video output device has functions of detecting whether the input/output terminal of the video output device is connected to the input terminal of the display apparatus through the first cable or the input/output terminal of the video output device is connected to the input/output terminal of the information device through the second cable, drawing a DC current from the output terminal section of the video output device in a case where the connection to the input terminal of the display apparatus through the first cable is detected, and maintaining the output terminal section of the video output device in a high resistance state in a DC manner in a case where the connection to the input/output terminal of the information device through the second cable is detected.

Effects of the Invention

With the technique of the present invention, it is possible to provide an information output device having an interface through which data can be output more preferably.

BRIEF DESCRIPTIONS OF THE DRAWINGS

FIG. 1 is a system configuration diagram according to a first embodiment;

FIG. 2 is a diagram for describing a pinout of a type A connector of HDMI according to the first embodiment;

FIG. 7 is a diagram for describing a connection between devices by the USB cable according to the first embodiment;

FIG. 8 is a diagram for describing a connection mapping (high speed transmission unit) of a connection between devices by a USB-HDMI conversion cable according to the first embodiment;

FIG. 9 is a diagram for describing a connection between devices by the USB-HDMI conversion cable according to the first embodiment;

FIG. 10 is a diagram for describing a connection between devices by the USB-HDMI conversion cable according to the first embodiment;

FIG. 11 is a diagram for describing a constant current circuitry of an output circuit according to the first embodiment;

FIG. 12 is a diagram for describing the output circuit according to the first embodiment;

DETAILED DESCRIPTION OF PREFERRED EMBODIMENTS

Figure 3:
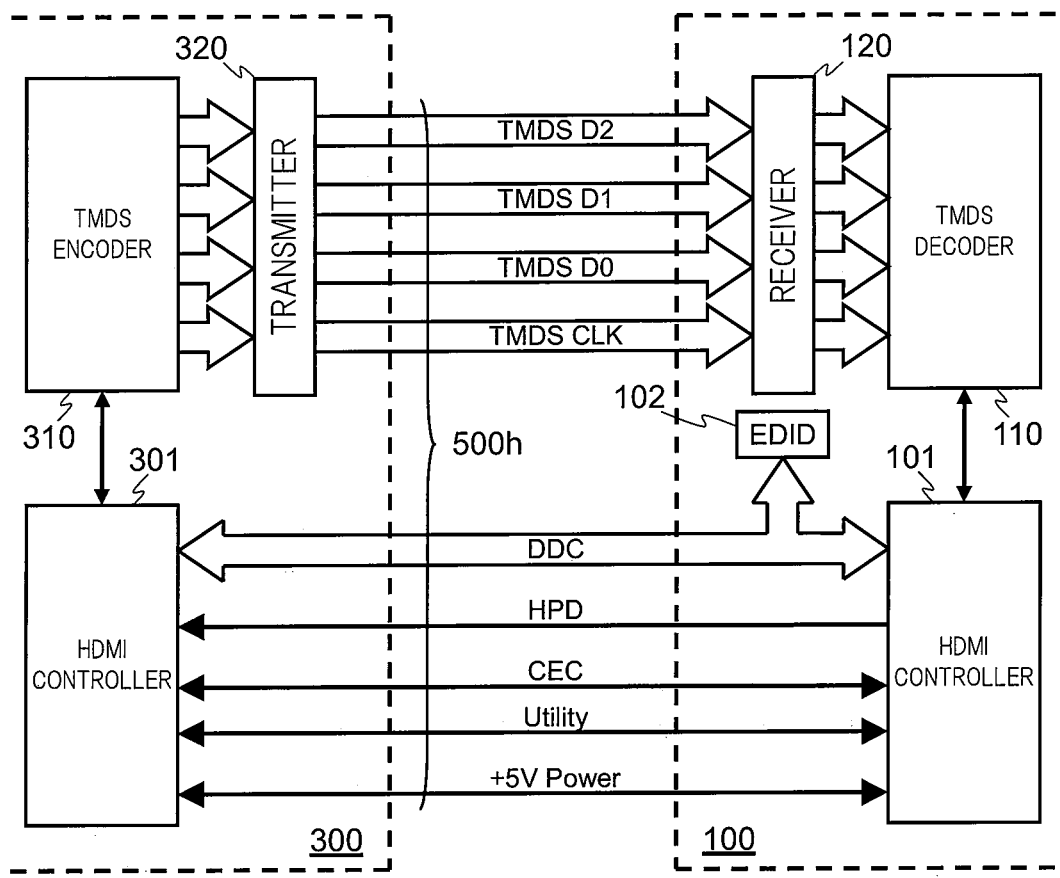
FIG. 3 is a diagram for describing a connection between devices by an HDMI cable according to the first embodiment.

Hereinafter, embodiments of the present invention will be described with reference to the drawings.

First Embodiment

FIG. 1 is a system configuration diagram illustrating an example of a video transmission system which includes a video output device of the present embodiment. The video transmission system of the present embodiment includes a display apparatus 100, a PC (Personal Computer) 200, a video player 300, a mobile information terminal 400, a cable 500$h$, a cable 500$u$, and a cable 500$c$. It is not always necessary to connect the PC 200 and the video player 300. The cables 500$h$, 500$u$, and 500$c$ may be appropriately selected according to a combination of connected devices. The mobile information terminal 400 corresponds to the video output device of the present embodiment.

It is assumed that the display apparatus 100 is a display monitor which includes one or more HDMI terminals. The display apparatus 100 can receive the input of digital audio visual data output from the video player 300 through the cable 500$h$ and display the digital audio visual data. Alternatively, the display apparatus 100 can receive the input of digital audio visual data output from the mobile information terminal 400 through the cable 500$c$ and display the digital audio visual data. The digital audio visual data input through the cable 500$h$ and the digital audio visual data input through the cable 500$c$ may be compressed digital data, or may be encrypted digital data. The digital audio visual data may be digital data subjected to both the compression process and the encryption, or may be digital data not subjected to any of the compression process and the encryption. In addition, the data is not limited to data obtained by digitalizing a video signal or an audio signal, but other digital data may be input from the HDMI terminal.

The display apparatus 100 is assumed to have functions of performing decompression process with respect to the compression process, decryption with respect to the encryption, or other digital signal processing in accordance with specifications of the digital data input from the HDMI terminal.

In addition, the display apparatus 100 may have a digital television function of displaying a digital broadcast program reproduced by receiving a digital broadcast wave through an antenna (not illustrated) and performing a decryption (decoding) process to a bit stream string acquired by demodulating the received digital broadcast wave, and other functions.

The PC 200 is assumed to be a general-purpose computer which is provided with one or more USB terminals and connected to an information appliance such as the mobile information terminal 400 or other peripheral devices through the cable 500$u$ or the like to transmit and receive various types of data. Also, the PC 200 is assumed to be connected to a display device (or may be the display apparatus 100) such as a display monitor, an input device such as a keyboard, and a pointing device such as a mouse. However, these devices are not illustrated in the drawing.

The video player 300 is, for example, a BD player, and is assumed to be able to read the bit stream string recorded in an optical disk and output the bit stream string after performing a predetermined process. The digital audio visual data output from the video player 300 may be input to the display apparatus 100 through the cable 500$h$. The video player 300 may be a BD recorder or an HDD (Hard Disc Drive) recorder which can record the bit stream string acquired by receiving a digital broadcast wave through an antenna (not illustrated) and demodulating the received digital broadcast wave in a recording media such as an HDD. In this case, the digital audio visual data obtained by performing a predetermined process on the bit stream string read from the recording media such as an HDD may be output to the display apparatus 100 through the cable 500$h$. The video player 300 may be an optical disk drive or an STB which has no recording function. Note that it is assumed that the terminal to output the digital audio visual data of the video player 300 is an HDMI.

The mobile information terminal 400 is assumed to be an information device including a smart phone which has a call function, an Internet connection function, a digital camera function, a moving image playback function, etc. The mobile information terminal 400 may be a digital device which can output a video signal such as a tablet or a digital camera, or may be an information device such as a PC. The mobile information terminal 400 can transmit and receive various types of data acquired using the Internet connection function and image data captured using the digital camera function, to and from the PC 200 connected through the cable 500$u$. In addition, the mobile information terminal 400 can output the digital audio visual data of an image captured using the digital camera function and a moving image reproduced using the moving image playback function to the display apparatus 100 through the cable 500$c$. Note that it is assumed that a terminal to output the digital audiovisual data of the mobile information terminal 400 is a USB.

The cable 500$h$ is an HDMI cable which can connect the HDMI terminals. Further, in the present embodiment, both ends of the cable 500$h$ are assumed to be type A connectors of the HDMI. Namely, in the present embodiment, the HDMI terminal provided in the display apparatus 100 and the HDMI terminal provided in the video player 300 both are the type A connectors. Note that the shape of the HDMI terminals of the cable 500$h$, the display apparatus 100, and the video player 300 is not limited to the type A. The cable 500$u$ is a USB cable which can connect the USB terminals. Further, in the present embodiment, both ends of the cable 500$u$ are assumed to be type C connectors of the USB. Namely, in the present embodiment, the USB terminal provided in the PC 200 and the USB terminal provided in the mobile information terminal 400 both are the type C connectors. Note that the shape of the USB terminal is not limited to the type C in the cable 500*u* on a side of the PC 200 and in the PC 200. The cable 500*c* is a USB-HDMI conversion cable which can connect the USB terminal and the HDMI terminal. In the present embodiment, one end of the cable 500*c* is the type A connector of the HDMI, and the other end is the type C connector of the USB.

Note that, when the video player 300 and the display apparatus 100 are connected through the cable 500*h* or the mobile information terminal 400 and the display apparatus 100 are connected through the cable 500*c*, the video player 300 and the mobile information terminal 400 are referred to as a source device and the display apparatus is referred to as a sink device in some cases. In addition, when the mobile information terminal 400 and the PC 200 are connected through the cable 500*u*, one of them is referred to as a host and the other is referred to as a device in some cases.

FIG. 2 is a diagram illustrating a pinout in the type A connector of the HDMI. Note that detailed descriptions of the respective signal lines in the drawing will be omitted. In addition, FIG. 3 is a diagram illustrating a connection between devices when the video player 300 (source device) and the display apparatus 100 (sink device) are connected through the cable 500*h*.

In FIG. 3, the respective signal lines of "TMDS (Transition Minimized Differential Signaling) D2", "TMDS D1", "TMDS D0", and "TMDS CLK" are four groups of high speed transmission lanes through which data can be transmitted at a high bit rate. The high speed transmission lane "TMDS D2" is configured by shielding a pair of "TMDS D2+ (Pin: 1)" and "TMDS D2− (Pin: 3)" with "TMDS D2 shield (Pin: 2)". The other high speed transmission lanes may be similarly configured. The four groups of high speed transmission lanes may include three groups of data transmission lanes and one group of reference clock transmission lane, or include four groups of data transmission lanes in which at least one group is subjected to a clock superimposing process. In addition, the respective signal lines of "DDC (Display Data Channel)", "HPD (Hot Plug Detect)", "CEC (Consumer Electronics Control)", and "Utility" are used to transmit and receive various control signals between the devices.

In the video player 300, an HDMI transmission unit is configured of an HDMI controller 301, a TMDS encoder 310, and a transmitter 320. The HDMI transmission unit may be one semiconductor element which includes the HDMI controller 301, the TMDS encoder 310, and the transmitter 320. Apart of the transmitter 320 may be included in the semiconductor element, and the other part may be disposed in the outside of the semiconductor element. Some or all of the functions of the HDMI controller 301 may be executed by a main controller (not illustrated) of the video player 300.

Similarly, in the display apparatus 100, an HDMI reception unit is configured of an HDMI controller 101, an EDID (Extended Display Identification Data) memory 102, a TMDS decoder 110, and a receiver 120. The HDMI reception unit may be one semiconductor element which includes the HDMI controller 101, the EDID memory 102, the TMDS decoder 110, and the receiver 120. Apart of the receiver 120 may be included in the semiconductor element, and the other part may be disposed in the outside of the semiconductor element. Some or all of the functions of the HDMI controller 101 may be executed by a main controller (not illustrated) of the display apparatus 100. The EDID memory 102 may be a ROM (Read Only Memory) separated from the semiconductor element.

Figure 4:
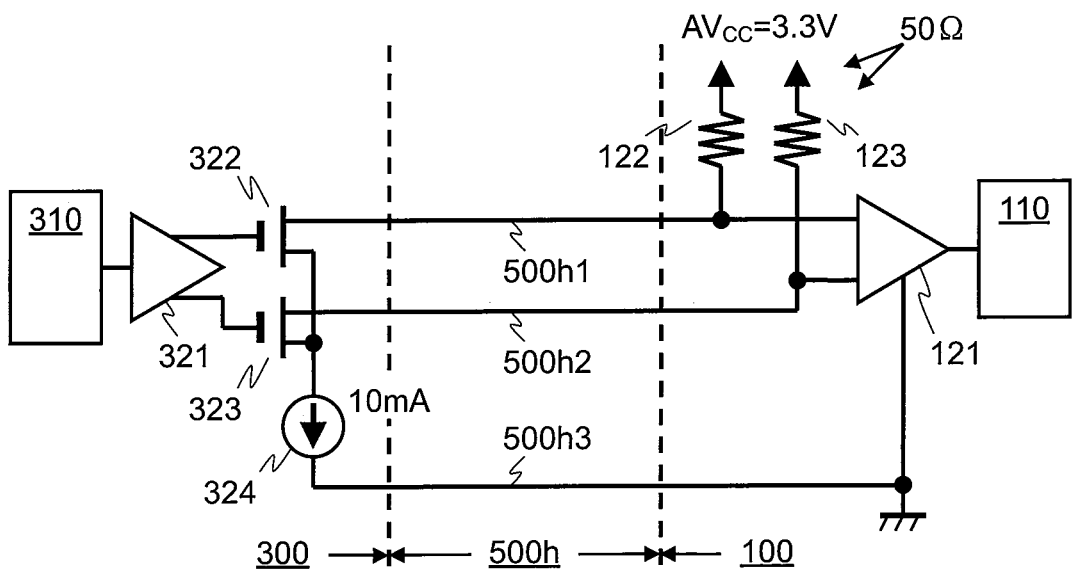
FIG. 4 is a diagram for describing a connection between devices by the HDMI cable according to the first embodiment.

FIG. 4 is a diagram illustrating a detailed configuration of the HDMI transmission unit and the HDMI reception unit, and particularly the transmitter 320 and the receiver 120 are illustrated in detail. However, only the portion related to the high speed transmission lane "TMDS D2" in FIG. 3 is illustrated, and illustrations of the other high speed transmission lanes and control signal lines are omitted.

In FIG. 4, a driver circuit 321 controls transistors 322 and 323 based on the output signal from the TMDS encoder 310. The transistors 322 and 323 are controlled such that, when one of them is turned on, the other is turned off. In the case where the states of the transistors 322 and 323 are "ON-OFF", current based on a constant current circuit 324 flows in a signal line 500*h*1 to generate a potential difference across a termination resistor 122, and since current does not flow in a signal line 500*h*2, a potential difference across a termination resistor 123 is "0". On the other hand, in the case where the states of the transistors 322 and 323 are "OFF-ON", the potential difference across the termination resistor 122 is "0", and the potential difference is generated across the termination resistor 123. When a receiver circuit 121 detects the potential difference of the termination resistors 122 and 123 on the basis of these operations, a differential transmission is performed between the video player 300 and the display apparatus 100.

Note that the signal line 500*h*1 corresponds to "TMDS D2+ (Pin: 1)", the signal line 500*h*2 corresponds to "TMDS D2− (Pin: 3)", and a signal line 500*h*3 corresponds to "TMDS D2 shield (Pin: 2)".

Figures 5, 6:
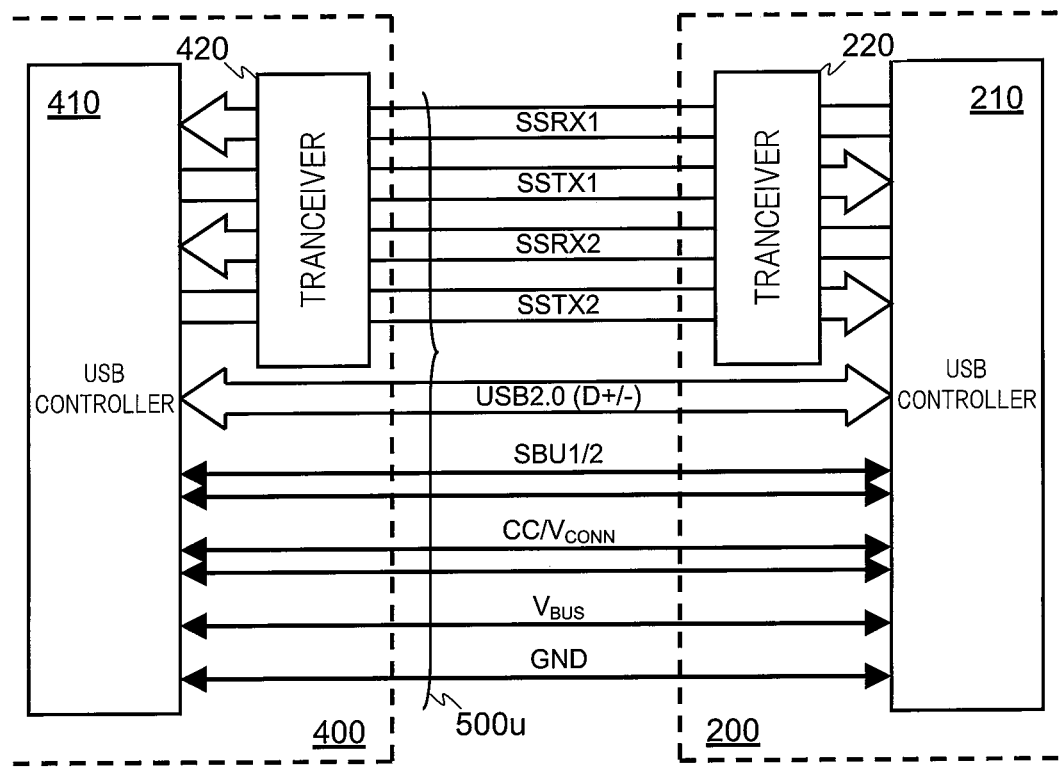
FIG. 5 is a diagram for describing a pinout of a type C connector of USB according to the first embodiment.
FIG. 6 is a diagram for describing a connection between devices by a USB cable according to the first embodiment.

FIG. 5 is a diagram illustrating a pinout in the type C connector of the USB. In particular, FIG. 5(A) illustrates the pinout on a receptacle side (device side), and FIG. 5(B) illustrates the pinout on a plug side (cable side). Note that detailed descriptions of the respective signal lines in the drawing will be omitted. In addition, FIG. 6 is a diagram illustrating a connection between devices when the mobile information terminal 400 (device) and the PC 200 (host) are connected through the cable 500*u*.

In FIG. 6, the respective signal lines of "SSTX1", "SSRX1", "SSTX2", and "SSRX2" are four groups of high speed transmission lanes through which data can be transmitted at a high bit rate. The high speed transmission lane "SSTX1" is configured of a pair of "TX1+ (Pin: A2)" and "TX1− (Pin: A3)". The other high speed transmission lanes may be similarly configured. The high speed transmission lanes "SSTX1" and "SSTX2" are lanes through which data is transmitted at a high speed from the mobile information terminal 400 toward the PC 200, and the high speed transmission lanes "SSRX1" and "SSRX2" are lanes through which data is transmitted at a high speed from the PC 200 toward the mobile information terminal 400. Namely, when viewed from the mobile information terminal 400, "SSTX1" and "SSTX2" are the high speed lanes for transmission, and "SSRX1" and "SSRX2" are the high speed lanes for reception. In addition, the respective signal lines such as "USB2.0", "SBU (Side Band Use) ½", and "CC/V$_{CONN}$" are used to transmit and receive various control signals between the devices.

In the mobile information terminal 400, a USB processor (device side) is configured of a USB controller 410 and a tranceiver 420. The USB processor (device side) may be one semiconductor element which includes the USB controller 410 and the tranceiver 420. A part of the tranceiver 420 may be included in the semiconductor element, and the other part may be disposed in the outside of the semiconductor element. Some or all of the functions of the USB controller 410 may be executed by a main controller (not illustrated) of the mobile information terminal 400.

Similarly, in the PC 200, a USB processor (host side) is configured of a USB controller 210 and a tranceiver 220. The USB processor (host side) may be one semiconductor element which includes the USB controller 210 and the tranceiver 220. A part of the tranceiver 220 may be included in the semiconductor element, and the other part may be disposed in the outside of the semiconductor element. Some or all of the functions of the USB controller 210 may be executed by a main controller (not illustrated) of the PC 200.

The USB processor (device side) and the USB processor (host side) may have the same configuration. In addition, the mobile information terminal 400 may be handled as the host of the USB, and the PC 200 may be handled as the device of the USB.

FIG. 7 is a diagram illustrating a detailed configuration of the USB processor (device side) and the USB processor (host side), and particularly the tranceiver 420 and the tranceiver 220 are illustrated in detail. However, only the portion related to the high speed transmission lanes "SSTX1" and "SSRX1" in FIG. 6 is illustrated, and illustrations of the other high speed transmission lanes and control signal lines are omitted.

In FIG. 7, a driver circuit 421 converts the output signal from the USB controller 410 into a differential signal, and transmits the differential signal to a receiver circuit 224 through a signal line 500u1 and a signal line 500u2. The receiver circuit 224 detects a potential difference between the signal line 500u1 and the signal line 500u2 which is generated by driving of the driver circuit 421. On the other hand, a receiver circuit 424 receives the differential signal obtained by converting the output signal from the USB controller 210 through a signal line 500u3 and a signal line 500u4. As illustrated in FIG. 7, the high speed transmission lanes "SSTX1" and "SSRX1" are configured by AC coupling of capacitors 422 and 423 and capacitors 222 and 223, respectively.

Note that the signal line 500u1 corresponds to "TX1+ (Pin: A2)", the signal line 500u2 corresponds to "TX1− (Pin: A3)", the signal line 500u3 corresponds to "RX1+ (Pin: B11)", and the signal line 500u4 corresponds to "RX1− (Pin: B10)".

FIG. 8 is a diagram illustrating an internal connection of the cable 500c. As described above, the cable 500c is a USB-HDMI conversion cable which can connect a device having the USB terminal and a device having the HDMI terminal, in which one end is configured of a type C connector of the USB having the pinout illustrated in FIG. 5(B) and the other end is configured of a type A connector of the HDMI having the pinout illustrated in FIG. 2.

The signal lines "TMDS D2+ (Pin 1)", "TMDS D2− (Pin: 3)", and "TMDS D2 shield (Pin: 2)" on a side of the HDMI terminal of the cable 500c are connected to the signal lines "RX1+ (Pin: B11)", "RX1− (Pin: B10)", and "GND (Pin: B12)" on a side of the USB terminal, respectively, and are used as one group of high speed transmission lane. With the similar connection, in the cable 500c, a total of four groups of high speed transmission lanes are used. In addition, the control signal lines may also be appropriately connected, but illustrations and detailed descriptions thereof will be omitted in the present embodiment.

FIG. 9 is a diagram illustrating a connection between the devices when the mobile information terminal 400 (source device) and the display apparatus 100 (sink device) are connected through the cable 500c. In FIG. 9, the mobile information terminal 400 operates as the source device of the HDMI instead of the device of the USB. Namely, the USB controller 410 in FIG. 9 is assumed to have also the similar functions to those of the HDMI controller 301 and the TMDS encoder 310 illustrated in FIG. 3. In addition, the high speed lanes for transmission "SSTX1" and "SSTX2" operate as the high speed transmission lanes "TMDS D1" and "TMDS CLK", and the high speed lanes for reception "SSRX1" and "SSRX2" operate as the high speed transmission lanes "TMDS D2" and "TMDS D0". These high speed transmission lanes transmit the data from the mobile information terminal 400 to the display apparatus 100. Namely, the data transmission direction of the high speed lanes for reception "SSRX1" and "SSRX2" is reversed when operated as the source device of the HDMI.

Note that the connection of the respective signal lines of the high speed transmission lane in the cable 500c and a combination with respect to the assignment of the high speed transmission lanes of the HDMI to the high speed transmission lanes of the USB when the mobile information terminal 400 operates as the source device of the HDMI are not limited to the above examples, but other combinations may be employed. However, since a capacitor is inserted to the output terminal (TX side) in the USB standard, it is preferable that the high speed transmission lanes "TMDS D1" and "TMDS CLK" of the HDMI having a relatively good DC balance are assigned to the high speed lanes for transmission "SSTX1" and "SSTX2" of the USB as described above and the high speed transmission lanes "TMDS D2" and "TMDS D0" having a relatively degraded DC balance are assigned to the high speed lanes for reception "SSRX1" and "SSRX2" of the USB in which there is no need to insert the capacitor.

In the mobile information terminal 400, a USB/HDMI processor is configured of the USB controller 410 and a tranceiver 430. The USB/HDMI processor may be one semiconductor element which includes the USB controller 410 and the tranceiver 430. A part of the tranceiver 430 may be included in the semiconductor element, and the other part may be disposed in the outside of the semiconductor element. Some or all of the functions of the USB controller 410 may be executed by the main controller (not illustrated) of the mobile information terminal 400. The configurations on a side of the display apparatus 100 are similar to those of FIG. 3, and the descriptions thereof will be omitted.

Note that the case where the mobile information terminal 400 operates as the source device of the HDMI, that is, the case where the USB/HDMI processor operates as the HDMI transmission unit is referred to as "HDMI operation mode". The case where the mobile information terminal 400 operates as the device of the USB, that is, the case where the USB/HDMI processor operates as the USB processor (device side) is referred to as "USB operation mode".

FIG. 10(A) is a diagram illustrating a detailed configuration of the USB/HDMI processor and the HDMI reception unit of the display apparatus 100, and particularly the tranceiver 430 and the receiver 120 are illustrated in detail. However, only the portion related to the high speed transmission lane "TMDS D1 (SSTX1)" in FIG. 9 is illustrated, and illustrations of the other high speed transmission lanes and control signal lines are omitted.

In the configuration of the USB/HDMI processor illustrated in FIG. 10(A), compared to the configuration of the USB processor (device side) illustrated in FIG. 7, resistors 432 and 433 are inserted between a driver circuit 431 and capacitors 434 and 435, and switches 436 and 437 and constant current circuits 438 and 439 are inserted in series between the output terminals of the capacitors 434 and 435 and the GND. The resistors 432 and 433 are assumed to have values in consideration of impedance matching with the termination resistors 121 and 122. In the present embodiment, it is assumed that the termination resistors 121 and 122 and the resistors 432 and 433 are all 50Ω.

The switches 436 and 437 may be controlled to be turned "ON" when the connection of the display apparatus 100 (that is, the sink device of the HDMI) to the mobile information terminal 400 through the cable 500c is detected. Alternatively, the switches may be controlled to be turned "ON" when the connection of the cable 500c (that is, the USB-HDMI conversion cable) to the mobile information terminal 400 is detected. Further, the switches may be controlled to be turned "ON" when a user of the mobile information terminal 400 selects "HDMI operation mode" by a menu operation or the like.

In this case, a power source (AVcc of the display apparatus 100) and the GND are connected through the termination resistor 121, the switch 436, and the constant current circuit 438, and the DC level of a signal line 500c1 is compensated on the basis of the control of the constant current circuit 438. Similarly, the power source and the GND are connected through the termination resistor 122, the switch 437, and a constant current circuit 439, and the DC level of a signal line 500c2 is compensated on the basis of the control of the constant current circuit 439. In the present embodiment, it is assumed that the termination resistors 121 and 122 are 50Ω and the constant current circuits 438 and 439 are 5 mA. Namely, in this state, the DC levels of the signal lines 500c1 and 500c2 are compensated to 3.05 V (=3.3 V−5 mA×50Ω). The differential signal output from the driver circuit 431 in this state is input to a receiver circuit 123 at the voltage satisfying an input specification of the HDMI (TMDS) through the signal line 500c1 and the signal line 500c2.

Further, in the connection between the HDMI devices, as illustrated in FIG. 4, the constant current circuit 324 of 10 mA is switched by two differential terminals, and thus an average current flowing in each terminal is a half to be about 5 mA. Therefore, the constant current values of the constant current circuits 438 and 439 illustrated in FIG. 10 are set to 5 mA.

In addition, in FIG. 10, one ends of the constant current circuits 438 and 439 are grounded on the side of the mobile information terminal 400 (source device). However, similarly to the configuration of FIG. 4, the constant current circuits may be grounded only on the side of the display apparatus 100 (sink device) through a signal line 500c3 without being grounded on the side of the mobile information terminal 400. Also, in the case of the configuration of FIG. 10(A), a constant return current flows in the signal line 500c3. Therefore, a DC potential difference is generated between the GND on the side of the mobile information terminal 400 and the GND on the side of the display apparatus 100 by a series resistance component of the signal line 500c3. Therefore, it is also possible to adopt the configuration in which a capacitor (not illustrated) is inserted between the constant current circuits 438 and 439 and the signal line 500c3 on the side of the mobile information terminal 400 to cut the DC potential difference and high frequency components are returned to the side of the display apparatus 100 through the signal line 500u3.

Note that the signal line 500c1 corresponds to "TMDS D1+ (Pin: 4)/TX1+ (Pin: A2)", the signal line 500c2 corresponds to "TMDS D1− (Pin: 6)/TX1− (Pin: A3)", and the signal line 500c3 corresponds to "TMDS D1 shield (Pin: 5)/GND (Pin: A1)".

FIG. 10(B) is a diagram illustrating a detailed configuration of the USB/HDMI processor and the USB processor (host side) of the PC 200 in the case where the mobile information terminal 400 provided with the USB/HDMI processor is connected to the PC 200 (the host of the USB) to be operated as the device of the USB, and particularly the tranceiver 430 and the tranceiver 220 are illustrated in detail. However, only the portion related to the high speed transmission lane "TMDS D1 (SSTX1)" in FIG. 9 is illustrated, and illustrations of the other high speed transmission lanes and control signal lines are omitted.

In the case where the USB/HDMI processor of the mobile information terminal 400 is operated as the USB processor (device side), that is, the case of the "USB operation mode", the switches 436 and 437 may be controlled to be turned "OFF". In this case, the USB/HDMI processor can operate similarly to the USB processor (device side) illustrated in FIG. 7.

In addition, the switches 436 and 437 and the constant current circuits 438 and 439 of FIG. 10 may be replaced with a resistor 441, the transistors 442, 443, and 444, and a switch 445 as illustrated in FIG. 11. In this case, a current limit of the constant current circuit can be shared by the resistor 441 and the transistor 442, and the functions of the switches 436 and 437 can be shared by the switch 445. Note that, in the circuit configuration of FIG. 11, it is necessary that a control logic of the switch 445 is inverse to the control logic of the switches 436 and 437. Namely, the switch 445 is controlled to be turned "OFF" when the connection of the display apparatus 100 to the mobile information terminal 400 through the cable 500c is detected. Alternatively, the switch is controlled to be turned "OFF" when the connection of the cable 500c to the mobile information terminal 400 is detected. Further, the switch is controlled to be turned "OFF" when the user of the mobile information terminal 400 selects "HDMI operation mode" by a menu operation or the like.

In addition, the power supply to the resistor 441 may be controlled instead of the control of the switch 445. Specifically, the control may be performed such that power is supplied to the resistor 441 instead of turning "OFF" the switch 445 and the power supply to the resistor 441 is blocked (grounded) instead of turning "ON" the switch 445.

FIG. 12(A) is a diagram illustrating a circuit configuration of the USB/HDMI processor of the mobile information terminal 400 which is different from FIG. 10.

The configuration of the USB/HDMI processor illustrated in FIG. 12(A) is different from the configuration of the USB/HDMI processor illustrated in FIG. 10 in that resistors 456 and 457 and switches 458 and 459 are inserted in series between the output terminals of capacitors 454 and 455 and the GND. Similarly to the switches 436 and 437, the switches 458 and 459 may be controlled to be turned "ON" when the connection of the display apparatus 100 (that is, the sink device of the HDMI) to the mobile information terminal 400 through the cable 500c is detected. Alternatively, the switches may be controlled to be turned "ON" when the connection of the cable 500c (that is, the USB-HDMI conversion cable) to the mobile information terminal 400 is detected. Further, the switches may be controlled to be turned "ON" when the user of the mobile information terminal 400 selects "HDMI operation mode" by a menu operation or the like.

In this case, the power source (AVcc of the display apparatus 100) and the GND are connected through the termination resistor 121, the resistor 456, and the switch 458, and the DC level of the signal line 500c1 is compensated by a voltage division of the termination resistor 121 and the resistor 456. Similarly, the power source and the GND are connected through the termination resistor 122, the resistor 457, and the switch 459, and the DC level of the signal line 500c2 is compensated by the voltage division of the termination resistor 122 and the resistor 457. In the present embodiment, it is assumed that the termination resistors 121 and 122 are 50Ω and the resistors 456 and 457 are 610Ω. Namely, in this state, the DC levels of the signal lines 500c1 and 500c2 are compensated to 3.05 V (=3.3 V×610Ω (610 Ω+50Ω)).

In addition, resistors 452 and 453 are assumed to have values in consideration of the impedance matching with the termination resistors 121 and 122. In the present embodiment, it is assumed that the resistors 432 and 433 are 54Ω in consideration of 610Ω of the resistors 456 and 457.

With this circuit configuration, the differential signal output from a driver circuit 451 is input to the receiver circuit 123 at the voltage satisfying an input specification of the HDMI (TMDS) through the signal line 500c1 and the signal line 500c2. In addition, in the case where the switches 458 and 459 are turned "OFF", the USB/HDMI processor can operate similarly to the USB processor (device side) illustrated in FIG. 7.

FIG. 12(B) is a diagram illustrating another example of the circuit configuration of the USB/HDMI processor of the mobile information terminal 400 which is different from FIG. 10. The configuration of the USB/HDMI processor illustrated in FIG. 12(B) is different from the configuration of the USB/HDMI processor illustrated in FIG. 10 in that resistors 466 and 467, inductors 468 and 469, and the switches 46A and 46B are inserted in series between the output terminals of capacitors 464 and 465 and the GND.

FIG. 12(C) is a diagram illustrating another example of the circuit configuration of the USB/HDMI processor of the mobile information terminal 400 which is different from FIG. 10. The configuration of the USB/HDMI processor illustrated in FIG. 12(C) is different from the configuration of the USB/HDMI processor illustrated in FIG. 10 in that inductors 476 and 477, constant voltage circuits 478 and 479, and the switches 47A and 47B are inserted in series between the output terminals of capacitors 474 and 475 and the GND.

Even in any of these circuit configurations, the DC levels of the signal lines 500c1 and 500c2 are compensated, and the differential signal output from a driver circuit 461 (or a driver circuit 471) is input to the receiver circuit 123 at the voltage satisfying the input specification of the HDMI (TMDS) through the signal line 500c1 and the signal line 500c2. In addition, in the case where the switches 46A and 46B (or the switches 47A and 47B) are turned "OFF", the USB/HDMI processor can operate similarly to the USB processor (device side) illustrated in FIG. 7.

As an example of the circuit configuration in which the AC coupling is converted to the DC coupling similarly to the USB/HDMI processor illustrated in FIGS. 10 and 12, there is a DP++ circuit configuration in which a DP (Display Port) is converted to the HDMI. In DP++, for example, the AC output signal of the DP is matched to the DC level of the LVDS (Low Voltage Differential Signaling) by applying a bias voltage using a resistor, and then converted to the TMDS output. On the other hand, the circuit configuration of FIG. 12(A) of the present embodiment is different from the DP++ in that the DC level is compensated by the voltage division of the termination resistor (the resistors 121 and 122) and the pull-down resistor (the resistors 456 and 457) and the voltage division is controlled by the switch (the switches 458 and 459).

The connection of the display apparatus 100 (that is, the sink device of the HDMI) to the mobile information terminal 400 through the cable 500c or the connection of the cable 500c (that is, the USB-HDMI conversion cable) to the mobile information terminal 400 may be detected as in the example described below.

Figure 13:
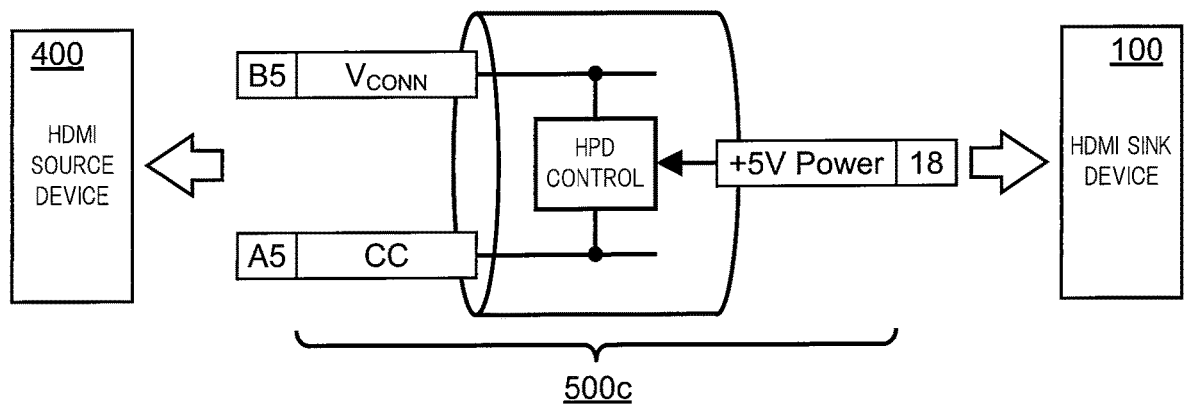
FIG. 13 is a diagram for describing a connection detecting process of the USB-HDMI conversion cable according to the first embodiment.

As illustrated in FIG. 13, an HPD control circuit is prepared in the cable 500c. The HPD control circuit is inserted between a "$V_{CONN}$ (Pin: B5)" terminal and a "CC (Pin: A5)" terminal on the USB terminal side. The HPD control circuit may be driven by the power supplied from "$V_{BUS}$ (Pin: A4/A9/B4/B9)" terminals. The HPD control circuit receives an input of a connection confirmation signal from the mobile information terminal 400 through the "$V_{CONN}$ (Pin: B5)" terminal, and outputs a connection detection signal to the mobile information terminal 400 through the "CC (Pin: A5)" terminal in accordance with the input. The mobile information terminal 400 can detect whether the cable 500c is connected, by monitoring the connection detection signal output from the "CC (Pin: A5)" terminal. In addition, the HPD control circuit may be configured so as to receive an input of the connection confirmation signal from the mobile information terminal 400 through the "CC (Pin: A5)" terminal and output the connection detection signal to the mobile information terminal 400 through the "$V_{CONN}$ (Pin: B5)" terminal in accordance with the input. Namely, in this case, the mobile information terminal 400 may monitor the connection detection signal which is output from the "$V_{CONN}$ (Pin: B5)" terminal.

In addition, the HPD control circuit may be driven by the power supplied from a "+5 V Power (Pin: 18)" terminal on the HDMI terminal side. With such a configuration, it is possible to detect the connection of the cable 500c and further the connection of the display apparatus 100 (the sink device of the HDMI) through the cable 500c. Also, the HPD control circuit may be driven by the power supplied from the "$V_{BUS}$ (Pin: A4/A9/B4/B9)" terminals, and the HPD control circuit may output the connection detection signal to the mobile information terminal 400 through the "$V_{CONN}$ (Pin: B5)" terminal (or the "CC (Pin: A5)" terminal) in accordance with the connection confirmation signal input from the mobile information terminal 400 through the "CC (Pin: A5)" terminal (or the "$V_{CONN}$ (Pin: B5)" terminal) and the power supplied from the "+5 V Power (Pin: 18)" terminal.

As described above, in the mobile information terminal 400 of the present embodiment, the USB/HDMI processor can be controlled to operate in the "HDMI operation mode" or the "USB operation mode" depending on whether the device connected through the cable is the sink device of the HDMI or the host of the USB. Namely, more preferable data output adaptable to a plurality of interface specifications by a single terminal is possible.

Second Embodiment

In the following, a second embodiment of the present invention will be described. Note that configurations, processes, and effects in the present embodiment are similar to those of the first embodiment unless otherwise specified. Therefore, the description of the present embodiment in the following will be focused on differences from the first embodiment, and the description of the common features will be omitted as much as possible in order to avoid redundancy.

As described in the first embodiment, the USB/HDMI processor in the mobile information terminal 400 can output data at a high bit rate to the sink device of the HDMI and input and output data at a high bit rate from and to the host of the USB. In addition, in the case where the data is output to the sink device of the HDMI at a high bit rate, a +3.3 V power source driving signal on the basis of the input/output specification of the HDMI is transmitted to an output terminal section of the USB/HDMI processor and the high speed transmission lane of the cable 500c. On the other hand, in the case where the data is input or output to or from the host of the USB at a high bit rate, a +1.5 V power source driving signal on the basis of the input/output specification of the USB is transmitted to the input/output terminal section of the USB/HDMI processor and the high speed transmission lane of the cable 500u.

Herein, for example, in the case where the mobile information terminal 400 remains in the "USB operation mode" even after the mobile information terminal 400 and the display apparatus 100 (the sink device of the HDMI) are connected through the cable 500c, the +3.3 V power source driving signal (that is, a signal exceeding +1.5 V) is added to an input/output terminal section of the USB/HDMI processor, which is not preferable. Therefore, in the present embodiment, a protection circuit is prepared in the cable 500c.

Figure 14:
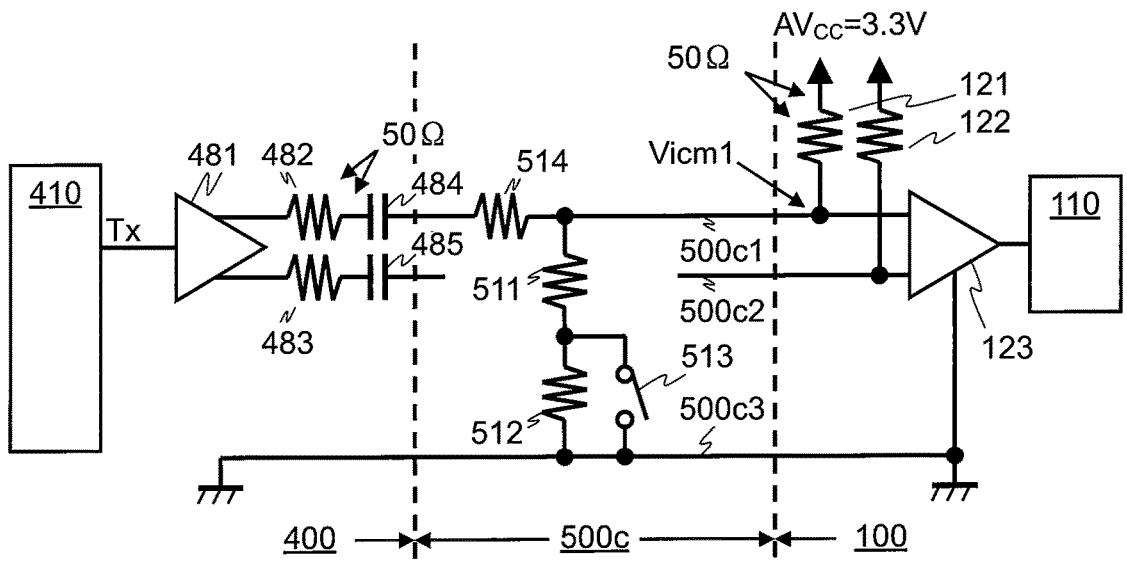
FIG. 14 is a diagram for describing a connection between devices by a USB-HDMI conversion cable according to a second embodiment.

FIG. 14 illustrates the configuration of the protection circuit in the cable 500c together with the detailed configuration of the tranceiver 430 of the mobile information terminal 400 (the source device of the HDMI) and the detailed configuration of the receiver 120 of the display apparatus 100 (the sink device of the HDMI). However, only the portion related to the high speed transmission lane "TMDS D1 (SSTX1)" in FIG. 9 is illustrated, and illustrations of the other high speed transmission lanes and control signal lines are omitted. In addition, with respect to the inner configuration of the cable 500c, only the signal line 500c1 which connects "TMDS D1+(Pin: 4)" on the HDMI terminal side and "TX1+(Pin: A2)" on the USB terminal side is illustrated among the signal lines of the high speed transmission lane "TMDS D1 (SSTX1)". For the sake of simplicity in the drawing, illustration of the signal line 500c2 which connects "TMDS D1- (Pin: 6)" on the HDMI terminal side and "TX1- (Pin: A3)" on the USB terminal side is omitted, but the signal line 500c2 is assumed to have the similar configuration to the signal line 500c1.

Even in the configuration of the USB/HDMI processor illustrated in FIG. 14, resistors 482 and 483 are assumed to have values in consideration of the impedance matching with the termination resistors 121 and 122. In the present embodiment, it is assumed that the termination resistors 121 and 122 and the resistors 482 and 483 are all 50Ω.

In the cable 500c illustrated in FIG. 14, the protection circuit is inserted between the signal line 500c1 and the signal line 500c3. The protection circuit is configured of resistors 511 and 512 which are connected in series between the signal line 500c1 and the signal line 500c3 and a switch 513 which is connected between a connection point of the resistors 511 and 512 and the signal line 500c3 in parallel with the resistor 512. A resistor 514 inserted in the signal line 500c1 is provided for the impedance matching. The switch 513 may be controlled to be turned "OFF" when the USB/HDMI processor of the mobile information terminal 400 operates in the "HDMI operation mode".

In the case where the mobile information terminal 400 operates in the "HDMI operation mode", the DC level of the signal line 500c1 is compensated by the voltage division of the resistor 121 and the resistors 511 and 512. Therefore, the DC level of the signal line 500c1 in the "HDMI operation mode" is expressed as follows.

$$AVcc \times (\text{Resistor } 511 + \text{Resistor } 512) \div (\text{Resistor } 121 + \text{Resistor } 511 + \text{Resistor } 512) \quad \text{(Expression 1)}$$

On the other hand, in the case where the mobile information terminal 400 operates in the "USB operation mode", the DC level of the signal line 500c1 is compensated by the voltage division of the resistor 121 and the resistor 511. Therefore, the DC level of the signal line 500c1 in the "USB operation mode" is expressed as follows.

$$AVcc \times (\text{Resistor } 511) \div (\text{Resistor } 121 + \text{Resistor } 511) \quad \text{(Expression 2)}$$

Herein, a terminal protection specification of the USB is defined to 0 to 1.5 V, the termination power source AVcc of the sink device of the HDMI is defined to 3.3 V±5%, and the termination resistor (the resistors 121 and 122) is defined to 50 Ω±10%. Therefore, the upper limit value of the resistor 511 is obtained as follows based on (Expression 2).

$$45(\Omega) \times 1.5\ (V) \div (3.465\ (V) - 1.5\ (V)) \approx 34(\Omega)$$

It is preferable that the value of about 32Ω is used in consideration of a variation in the resistors.

In addition, the DC potential of the signal line 500c1 is necessarily equal to or more than "Avcc—400 mV" and equal to or less than "Avcc—37.5 mV" in the case where the display apparatus 100 (the sink device of the HDMI) operates at a frequency equal to or more than 165 MHz. Therefore, the total value of the resistor 511 and the resistor 512 is as follows based on (Expression 1).

Minimum Value: $5(\Omega) \times (3.465\ (V) \div 0.4\ (V)) - 55(\Omega) \approx 421(\Omega)$ Maximum Value: $45(\Omega) \times (3.135\ (V) \div 0.0375\ (V)) - 45(\Omega) = 3717(\Omega)$ However, in practice, some error is allowed in AVcc and the resistor itself has an error. Therefore, a setting range of the value of the resistor 512 should be narrower than the range mentioned above.

From the above conditions, the DC level of the signal line 500c1 in the case where the values of the resistors 121, 511, and 512 are respectively set to 50 Ω, 32Ω, and 578Ω is 3.05 V in the "HDMI operation mode" and is 1.29 V in the "USB operation mode". In addition, an example of calculation values of the DC level of the signal line 500c1 (Vicm1) under various conditions is illustrated in the table of FIG. 14.

In addition, in the configuration of FIG. 14, the switch 458 in the configuration of FIG. 12(A) is omitted from the protection circuit (the resistors 511 and 512 and the switch 513) inserted in the cable 500c. Since the cable 500c does not connect the USB devices, the function of the switch 458 can be replaced by inserting the cable to the connector. Namely, the cost can be reduced by omitting the circuit corresponding to the resistor 456 and the switch 458 from the USB/HDMI processor of the mobile information terminal 400.

Next, the impedance matching will be described.

In the "HDMI operation mode", since the total value of the resistor 511 and the resistor 512 of, for example, 610Ω (=32 Ω+578Ω) is input in parallel with a cable impedance of 50Ω (differential 100Ω), it is preferable that the resistor 514 is set to 4Ω in order to be matched with 50Ω of the resistor 482 which is the output resistor of the mobile information terminal 400. Further, since a signal amplitude is lowered by inserting a serial resistor 514, it is preferable to set a driver circuit 481 to be higher by about 10% than the signal amplitude which is defined by the HDMI in the "HDMI operation mode".

The resistance value required for the impedance matching in the "HDMI operation mode" is lowered when the resistor 512 is increased. Therefore, when the resistor 512 is set to about 1,800Ω, unmatched impedance is about 3% and can fall within an impedance allowance range of ±10% required for the cable, so that the resistor 514 can be omitted and there is no need to take an action such as the amplitude increase of the driver circuit 481, resulting in easier mounting.

Figure 15:
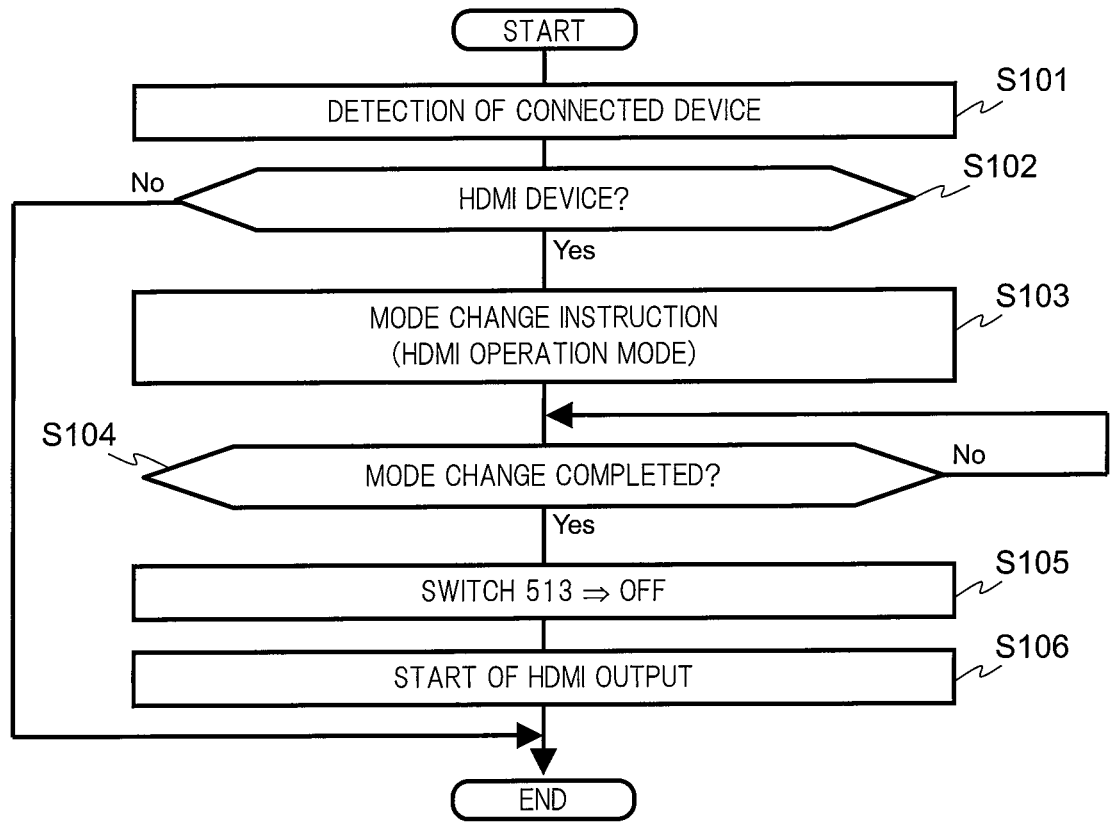
FIG. 15 is a sequence diagram for describing an operation mode switching process according to the second embodiment.

FIG. 15 illustrates a sequence diagram of an operation mode switching process between the "USB operation mode" and the "HDMI operation mode" in the mobile information terminal 400 in the case where the display apparatus 100 (that is, the sink device of the HDMI) is connected through the cable 500c. Note that it is assumed that the mobile information terminal 400 of the present embodiment operates in the "USB operation mode" in an initial state.

In the above-described state, the USB controller 410 of the mobile information terminal 400 continues to monitor whether a device is connected to the connection terminal, and detects the connection of any device when it is made (S101). In the case where the device whose connection is detected in the process of S101 is not the sink device of the HDMI (S102: No), the operation mode switching process to the "HDMI operation mode" is not performed. On the other hand, in the case where the device whose connection is detected in the process of S101 is the sink device of the HDMI (S102: Yes), the USB controller 410 instructs the USB/HDMI processor to change the operation mode to the "HDMI operation mode" (S103). Next, the USB controller 410 monitors whether the operation mode of the USB/HDMI processor is switched to the "HDMI operation mode" (S104). In the case where the switching process to the "HDMI operation mode" is not completed (S104: No), the USB controller 410 continues to monitor while setting the switch 513 in an "ON" state. In the case where the switching process to the "HDMI operation mode" is completed (S104: Yes), the USB controller 410 controls the switch 513 to be turned "OFF" (S105). Thereafter, data output to the display apparatus 100 (the sink device of the HDMI) is started.

With the above-described process, it is possible to prevent the +3.3 V power source driving signal (that is, a signal exceeding +1.5 V) from being applied to the input/output terminal section of the USB/HDMI processor in the state where the mobile information terminal 400 remains in the "USB operation mode".

Figure 16:
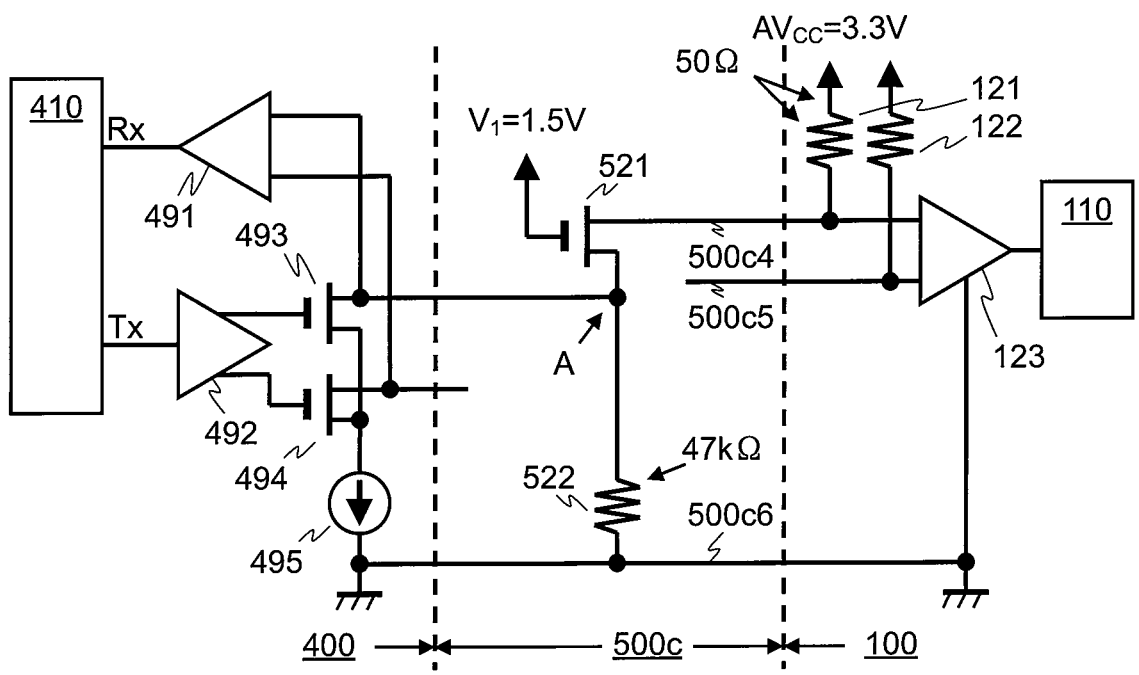
FIG. 16 is a diagram for describing a connection between devices by the USB-HDMI conversion cable according to the second embodiment.

FIG. 16 illustrates the configuration of the protection circuit in the cable 500c together with the detailed configuration of the tranceiver 430 of the mobile information terminal 400 (the source device of the HDMI) and the detailed configuration of the receiver 120 of the display apparatus 100 (the sink device of the HDMI). However, only the portion related to the high speed transmission lane "TMDS D2 (SSRX1)" in FIG. 9 is illustrated, and illustrations of the other high speed transmission lanes and control signal lines are omitted. In addition, with respect to the inner configuration of the cable 500c, only the signal line 500c4 which connects "TMDS D2+(Pin: 1)" on the HDMI terminal side and "RX1+(Pin: B11)" on the USB terminal side is illustrated among the signal lines of the high speed transmission lane "TMDS D2 (SSRX1)". For the sake of simplicity in the drawing, illustration of the signal line 500c5 which connects "TMDS D2− (Pin: 3)" on the HDMI terminal side and "RX1− (Pin: B10)" on the USB terminal side is omitted, but the signal line 500c5 is assumed to have the similar configuration to the signal line 500c4. Note that a signal line 500c6 is a shield line which connects "TMDS D2 shield (Pin: 2)" on the HDMI terminal side and "GND (Pin: B12)" on the USB terminal side.

In addition, a receiver circuit 491 is a circuitry which is activated when the mobile information terminal 400 operates in "USB operation mode", and is assumed to have the functions similar to those of a receiver circuit 424 in FIG. 7. A driver circuit 492, transistors 493 and 494, and a constant current circuit 495 form a circuitry which is activated when the mobile information terminal 400 operates in the "HDMI operation mode", and are assumed to have the functions similar to those of the driver circuit 321, the transistors 322 and 323, and the constant current circuit 324 of FIG. 4.

In the cable 500c illustrated in FIG. 16, a transistor 521 is inserted in series as the protection circuit between the USB terminal side (a side close to the mobile information terminal 400) of the signal line 500c4 and the HDMI terminal side (a side closer to the display apparatus 100), and the USB terminal side (a side closer to the mobile information terminal 400) of the transistor 521 and the signal line 500c6 are connected through a resistor 522. V1 (for example +1.5 V) based on $V_{BUS}$ supplied from the mobile information terminal 400 is applied to the gate of the transistor 521. The transistor 521 is configured such that a drain and a source are disconnected when the voltage of the source (the USB terminal side (a side closer to the mobile information terminal 400)) exceeds the voltage of the gate. Therefore, with such a circuit configuration, the voltage at Point A in the drawing does not exceed +1.5 V. The voltage V1 applied to the transistor 521 is not limited to +1.5 V, and can be set in consideration of the characteristics of the transistor 521 such that the voltage at Point A does not exceed +1.5 V. If a threshold voltage of the transistor 521 is about +0.6 V, the voltage V1 may be equal to or less than about +2.1 V.

With the above-described process, it is possible to prevent the +3.3 V power source driving signal (that is, a signal exceeding +1.5 V) from being applied to the input/output terminal section of the USB/HDMI processor in the state where the mobile information terminal 400 remains in the "USB operation mode".

The description about the high speed transmission lane "TMDS D2 (SSRX1)" of FIG. 16 has been given by way of example. However, it is apparent that the protection circuit in the cable can be applied even to the high speed transmission lanes "TMDS D1 (SSTX1)" and "TMDS CLK (SSTX2)" in which a pull-down element is used in the mobile information terminal illustrated in FIG. 10.

As described above, in the mobile information terminal 400 of the present embodiment, the USB/HDMI processor can be controlled to operate in either the "HDMI operation mode" or the "USB operation mode" depending on whether the device connected through the cable is the sink device of the HDMI or the host of the USB. Namely, more preferable data output adaptable to a plurality of interface specifications by a single terminal is possible.

In the foregoing, examples of the present invention have been described based on the first and second embodiments. However, the configuration to realize the technique of the present invention is not limited to the above-described embodiments, and various modifications can be considered. For example, some configurations of one embodiment may be replaced with the configurations of another embodiment, and the configuration of one embodiment may be added to the configuration of another embodiment. All these modifications belong to the scope of the present invention. In addition, numerical values, messages, names of the signal lines denoted in the texts and the drawings are given by way of example, and the effects of the present invention are not degraded even using other ones.

In addition, numerical values such as the voltage values and the resistance values denoted in the above-described descriptions and drawings are normally determined in consideration of a tolerable errors in an actual circuit configuration. However, for the sake of simplicity in the description, the notations related to errors are omitted in the embodiments. For example, only logical values are denoted for the numerical values of the resistance value, and an actual resistance value closest to the logical value may be employed in practice. All the difference in these numerical values is merely a modification within the scope of the preset invention.

REFERENCE SIGNS LIST 100 display apparatus
101 HDMI controller
102 EDID memory
110 TMDS decoder
120 receiver
200 PC
210 USB controller
220 tranceiver
300 video player
301 HDMI controller
310 TMDS encoder
320 transmitter
400 mobile information terminal
410 USB controller
420, 430 tranceiver
500$h$, 500$u$, 500$c$ cable

The invention claimed is:

1. A video output system, comprising:
a display apparatus including an input terminal;
an information device including an input/output terminal;
a video output device including an input/output terminal;
a first cable which connects the input terminal of the display apparatus and the input/output terminal of the video output device; and
a second cable which connects the input/output terminal of the information device and the input/output terminal of the video output device,
wherein only one of the first cable and the second cable is plugged into the input/output terminal of the video output device at a given time,
wherein the input terminal of the display apparatus has an input pin which is connected to an embedded termination power source through a termination resistor,
wherein the input/output terminal of the video output device has an output pin connected to a driver circuit through a capacitor, the output pin is further connected to a current controller,
wherein the first cable electrically connects the output pin of the video output device and the input pin of the display apparatus,
wherein the input/output terminal of the information device has an input pin connected to a receiver,
wherein the second cable electrically connects the output pin of the video output device and the input pin of the information device,
wherein the input/output terminal of the video output device has functions of
detecting whether the input/output terminal of the video output device is connected to the input terminal of the display apparatus through the first cable or the input/output terminal of the video output device is connected to the input/output terminal of the information device through the second cable,
drawing a DC current from the output pin of the video output device by the current controller in a case where the connection to the input terminal of the display apparatus through the first cable is detected, and
maintaining the output pin of the video output device in a high resistance state in a DC manner in a case where the connection to the input/output terminal of the information device through the second cable is detected,
wherein the input terminal of the display apparatus has a connector shape in conformity to an HDMI specification, and
wherein the input/output terminal of the information device and the input/output terminal of the video output device each have a connector shape in conformity to a USB specification.

2. A video output device having an input/output terminal capable of being connected to an input terminal of a display apparatus through a first cable and to an input/output terminal of an information device through a second cable,
wherein only one of the first cable and the second cable is plugged into the input/output terminal of the video output device at a given time,
wherein the input/output terminal of the video output device has an output pin connected to a driver circuit through a capacitor, the output pin is further connected to a current controller,
wherein the input/output terminal of the video output device has functions of
detecting whether the input/output terminal of the video output device is connected to the input terminal of the display apparatus through the first cable or the input/output terminal of the video output device is connected to the input/output terminal of the information device through the second cable,
drawing a DC current from the output pin of the video output device by the current controller in a case where the connection to the input terminal of the display apparatus through the first cable is detected, and
maintaining the output pin of the video output device in a high resistance state in a DC manner in a case where the connection to the input/output terminal of the information device through the second cable is detected,
wherein the input terminal of the display apparatus has a connector shape in conformity to an HDMI specification, and
wherein the input/output terminal of the information device and the input/output terminal of the video output device each have a connector shape in conformity to a USB specification.

* * * * *